United States Patent
Okuno

(10) Patent No.: US 7,085,041 B2
(45) Date of Patent: Aug. 1, 2006

(54) RAMAN AMPLIFIER AND OPTICAL TRANSMISSION SYSTEM

(75) Inventor: Toshiaki Okuno, Kanagawa (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 80 days.

(21) Appl. No.: 10/866,780

(22) Filed: Jun. 15, 2004

(65) Prior Publication Data

US 2005/0012987 A1    Jan. 20, 2005

(30) Foreign Application Priority Data

Jun. 16, 2003    (JP) .............................. 2003-171021

(51) Int. Cl.
*H01S 3/30*    (2006.01)
(52) U.S. Cl. ..................................... 359/334
(58) Field of Classification Search ............... 359/334; 372/6
See application file for complete search history.

(56) References Cited

U.S. PATENT DOCUMENTS

| | | | |
|---|---|---|---|
| 6,717,963 B1 * | 4/2004 | Foursa | 372/3 |
| 6,856,737 B1 * | 2/2005 | Parker et al. | 385/122 |
| 2004/0196531 A1 * | 10/2004 | Nicholson | 359/334 |

FOREIGN PATENT DOCUMENTS

| | | |
|---|---|---|
| EP | 001460783 A2 * | 9/2004 |
| JP | 11-195829 | 7/1999 |
| JP | 2002-40497 | 2/2002 |

OTHER PUBLICATIONS

Emori, Y. et al. "100-nm bandwith flat-gain Raman amplifiers pumped and gain-equalized by 12-wavelength-channel WDM laser diode unit", Electron, Lett, vol. 35, No. 16 (1999).
Tsuzaki, T. et al. "Broadband Discrete Fiber Raman Amplifier with High Differential Gain Operating Over 1.65 μm-band", OFC2001, MA3.

\* cited by examiner

*Primary Examiner*—Mark Hellner
(74) *Attorney, Agent, or Firm*—McDermott Will & Emery LLP

(57) ABSTRACT

Provided is a Raman amplifier which can be downsized and achieves a wider gain band. It includes a Raman-amplification optical fiber, a light source for outputting pulse light, a wide-band-light generator for receiving the pulse light and outputting wide-band light having a wider wavelength range than the pulse light, an optical filter, and a pump-light supply unit for supplying light from the optical filter to the Raman-amplification optical fiber. Also provided is an optical transmission system which employs the above-mentioned Raman amplifier and is suitable for transmitting multiplexed-wavelength signal light.

8 Claims, 7 Drawing Sheets

RAMAN AMPLIFIER AND OPTICAL TRANSMISSION SYSTEM

BACKGROUND OF THE INVENTION

1. Field of the Invention

The present invention relates to a Raman amplifier for causing Raman amplification of signal light and to an optical transmission system provided with such a Raman amplifier.

2. Description of the Related Art

The Raman amplifier amplifies signal light by utilizing the induced Raman scattering effect in an optical fiber to which pump light has been supplied. The Raman amplifiers have a wider gain band than rare-earth-element-doped optical fiber amplifiers. However, there continues to be a demand for the increase in the gain band of the Raman amplifiers.

To increase the gain band of the Raman amplifiers, a technique using multiplexed light having different wavelengths as pump light for Raman amplifiers is known (Y. Emori, et al., "100-nm bandwidth flat-gain Raman amplifiers pumped and gain-equalized by 12-wavelength-channel WDM laser diode unit", Electron. Lett., Vol. 35, No. 16 (1999)). Another technique using amplified spontaneous emission (ASE) light, which is generated by supplying pump light to an erbium (Er)-doped optical fiber, as pump light for Raman amplifiers is also known (T. Tsuzaki, et al., "Broadband Discrete Fiber Raman Amplifier with High Differential Gain Operating Over 1.65 µm-band", OFC2001, MA3).

However, in the first technique, many light sources are required, which increases the size of the device. In the second technique, the bandwidth of the pump light for Raman amplification is only about 35 nm, which is insufficient for wider-band Raman amplifiers.

SUMMARY OF THE INVENTION

It is an object of the present invention to provide a smaller and wider-gain-band Raman amplifier, and also to provide an optical transmission system which achieves long-distance transmission of multiplexed-wavelength signal light.

In order to achieve the above object, the present invention provides a Raman amplifier including: a Raman-amplification optical fiber; a light source for outputting pulse light; a wide-band-light generator for receiving the pulse light from the light source and outputting wide-band light having a wider wavelength range than the received pulse light; an optical filter for adjusting the spectrum of the wide-band light; and a pump-light supply unit for supplying the wide-band light output from the optical filter to the Raman-amplification optical fiber.

The optical filter may have a loss that substantially monotonously increases as the wavelength increases in a wavelength range of 40 nm, which contains the wavelength of the pulse light. Alternatively, the optical filter may adjust the spectrum of the wide-band light so that, as the wavelength increases, the spectrum of the wide-band light substantially monotonously decreases in a wavelength range of 40 nm containing the wavelength of the pulse light, except in the wavelength range of the pulse light.

The optical filter may adjust the spectrum of the wide-band light so that a variation in the Raman gain in a wavelength range of 60 nm in a range of 1500 to 1600 nm becomes 5.0 dB or smaller. Alternatively, the optical filter may adjust the spectrum of the wide-band light so that a variation in the Raman gain in a wavelength range of 60 nm in a range of 1600 to 1700 nm becomes 2.5 dB or smaller.

The present invention also provides an optical transmission system for transmitting multiplexed-wavelength signal light, including the above type of Raman amplifier.

Advantages of the present invention will become readily apparent from the following detailed description, which illustrates the best mode contemplated for carrying out the invention. The invention is capable of other and different embodiments, the details of which are capable of modifications in various obvious respects, all without departing from the invention. Accordingly, the drawings and description are illustrative in nature, not restrictive.

BRIEF DESCRIPTION OF THE DRAWINGS

The present invention is illustrated by way of examples, and not by way of limitation, in the figures of the accompanying drawings in which like reference numerals refer to similar elements.

DESCRIPTION OF THE PREFERRED EMBODIMENTS

The present invention is described in detail below with reference to the accompanying drawings through illustration of the preferred embodiments.

First Embodiment

Figure 1:
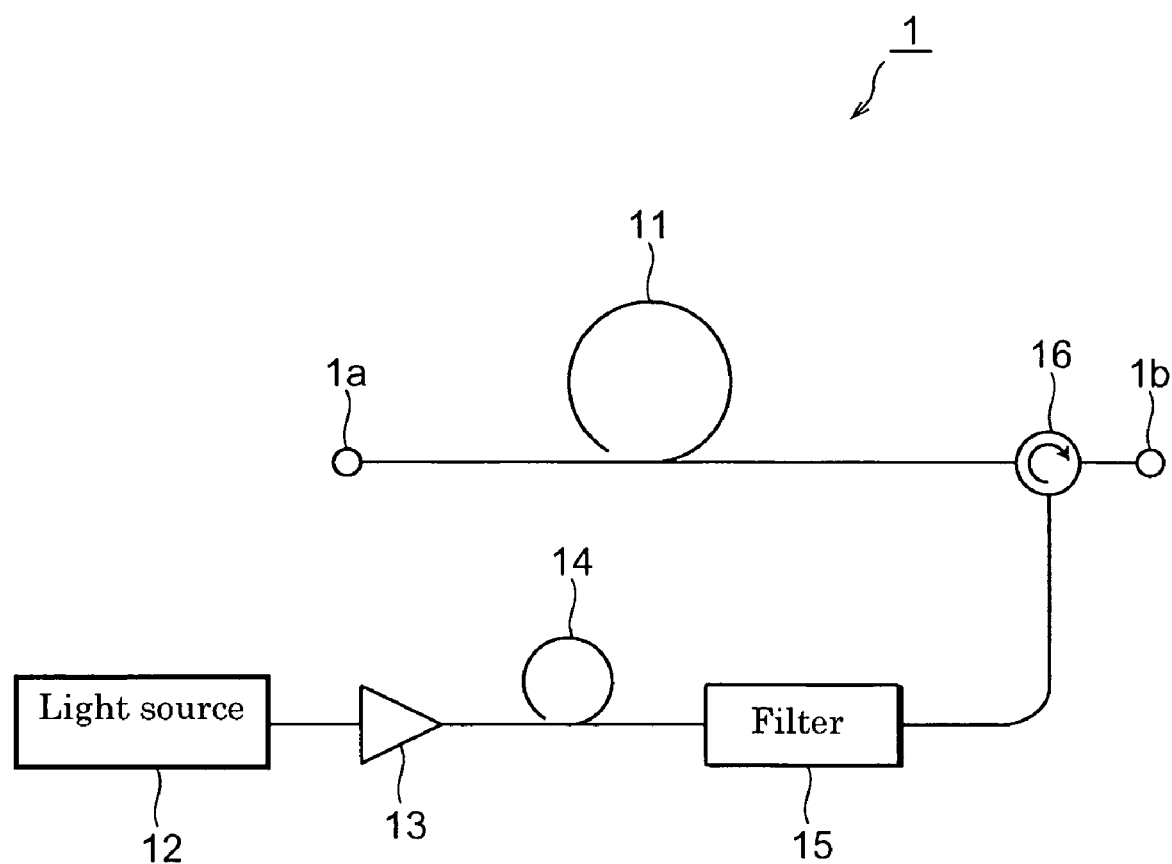
FIG. 1 schematically illustrates a Raman amplifier according to a first embodiment of the present invention.

A Raman amplifier 1 constructed in accordance with a first embodiment of the present invention is described below with reference to FIGS. 1 through 4. Reference is first made to FIG. 1. The Raman amplifier 1 causes signal light input into an input terminal 1a to undergo Raman amplification and outputs the amplified signal light from an output terminal 1b. The Raman amplifier 1 includes an optical fiber for Raman amplification (hereinafter referred to as the "Raman-amplification optical fiber") 11, a light source 12, an optical amplifier 13, a supercontinuum (SC) optical fiber (wide-band-light generating means) 14, an optical filter 15, and an optical circulator (pump-light supply means) 16.

The Raman-amplification optical fiber 11, which is an optical fiber exhibiting a highly non-linear characteristic, receives pump light for Raman amplification output from the optical circulator 16 and causes signal light input from the input terminal 1a to undergo Raman amplification while the signal light is being propagated therethrough. The light source 12 outputs pulse light. The optical amplifier 13 amplifies the pulse light output from the light source 12.

As in the first embodiment, the SC optical fiber 14 is preferably used as the wide-band-light generating means. The SC optical fiber 14 propagates the pulse light output from the optical amplifier 13, and increases the band of the pulse light while it is being propagated. A dispersion-flattened optical fiber, a highly non-linear optical fiber, or a dispersion-decreased optical fiber (an optical fiber whose chromatic dispersion gradually decreases in the longitudinal direction) for example may preferably be used as the SC optical fiber 14. The non-linear coefficient of the SC optical fiber 14 preferably is 10/W/km or greater, in which case, the non-linear optical phenomenon is likely to occur in the SC optical fiber 14 to generate wide-band light.

The optical filter 15 adjusts the spectrum of the wide-band light output thereinto from the SC optical fiber 14. The optical circulator 16 receives the light output from the optical filter 15, and supplies the light backward to the Raman-amplification optical fiber 11 as pump light for Raman amplification. The optical circulator 16 also receives the signal light subjected to Raman amplification in the Raman-amplification optical fiber 11, and outputs the signal light to the output terminal 1b.

If the wavelength of the pulse light output from the light source 12 is about 1.55 μm, an Er-doped optical fiber amplifier is preferably used as the optical amplifier 13. If the bandwidth of the wider-band light output from the SC optical fiber 14 is about 100 nm, the resulting gain band of the Raman amplifier 1 is approximately 1600 to 1700 nm. If the wavelength of the pulse light output from the light source 12 is about 1.3 μm, a semiconductor optical amplifier or a Pr-doped optical fiber amplifier is preferably used as the optical amplifier 13. If the bandwidth of the wider-band light output from the SC optical fiber 14 is about 80 nm, the resulting gain band of the Raman amplifier 1 is approximately 1350 to 1450 nm.

Figure 2A:
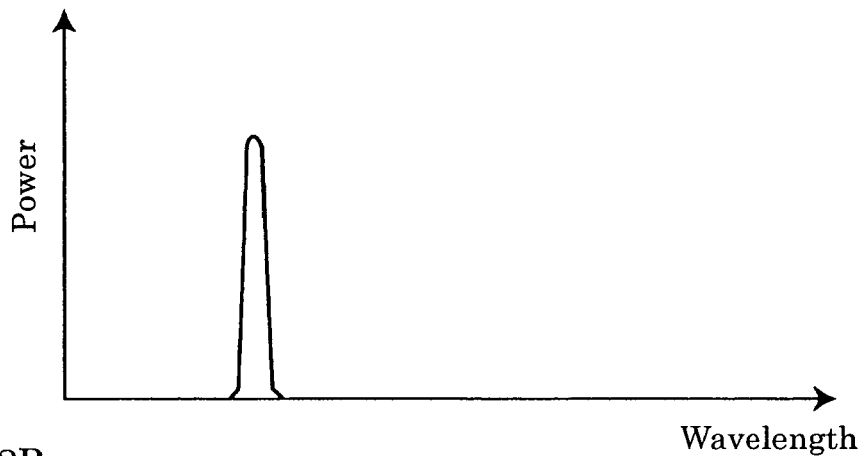
FIGS. 2A through 2C illustrate the operation of the Raman amplifier of the first embodiment.
Figure 2B:
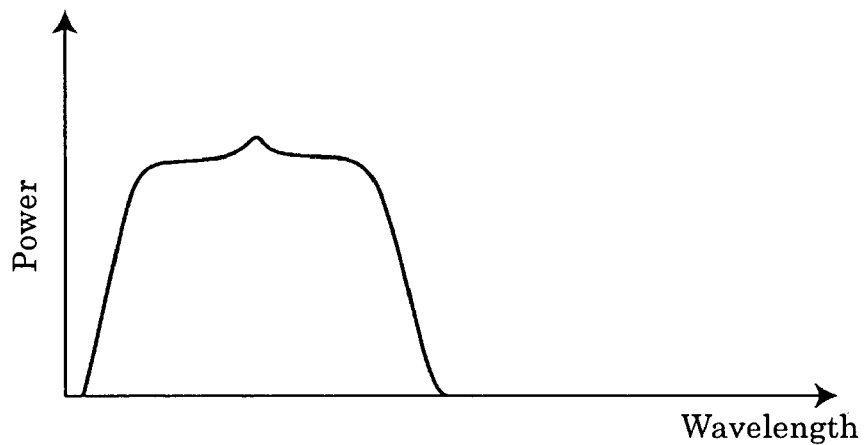
Figure 2C:
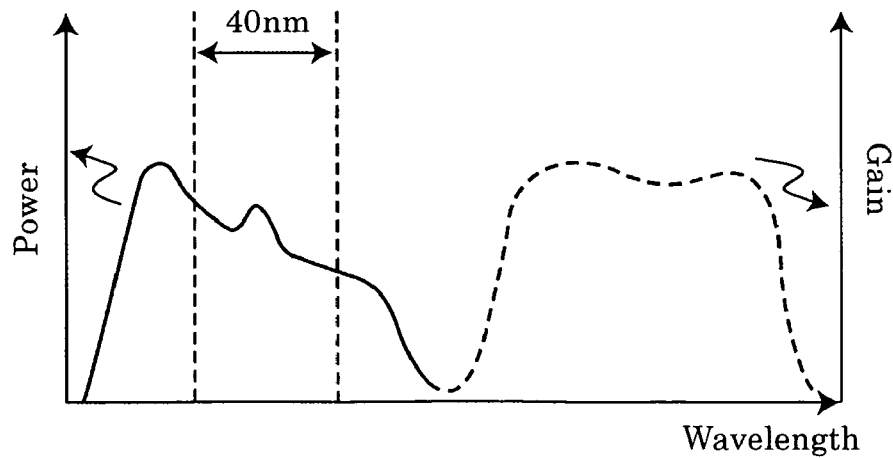

The operation of the Raman amplifier 1 is as follows. FIGS. 2A through 2C illustrate the operation of the Raman amplifier 1 of the first embodiment: FIG. 2A illustrates the output spectrum of the light source 12; FIG. 2B illustrates the output spectrum of the SC optical fiber 14; and FIG. 2C illustrates the pump light spectrum (solid line) and the gain spectrum (broken line).

Narrow-band pulse light (FIG. 2A) output from the light source 12 is amplified in the optical amplifier 13 and is input into the SC optical fiber 14. When the pulse light is input into the SC optical fiber 14, wide-band supercontinuum (SC) light (FIG. 2B) is generated. The spectrum of this wide-band light is adjusted by the optical filter 15, and is then supplied to the Raman-amplification optical fiber 11 via the optical circulator 16 as the pump light for Raman amplification (indicated by the solid line in FIG. 2C).

The signal light is input into the Raman-amplification optical fiber 11 via the input terminal 1a and is subjected to Raman amplification. The Raman-amplified signal light is then output from the output terminal 1b via the optical circulator 16. The optical circulator 16 receives the light output from the optical filter 15, and supplies the light backward to the Raman-amplification optical fiber 11 as pump light for Raman amplification. As a result, the gain spectrum of the Raman-amplification optical fiber 11 (indicated by the broken line in FIG. 2C) can be flattened.

Figure 3:
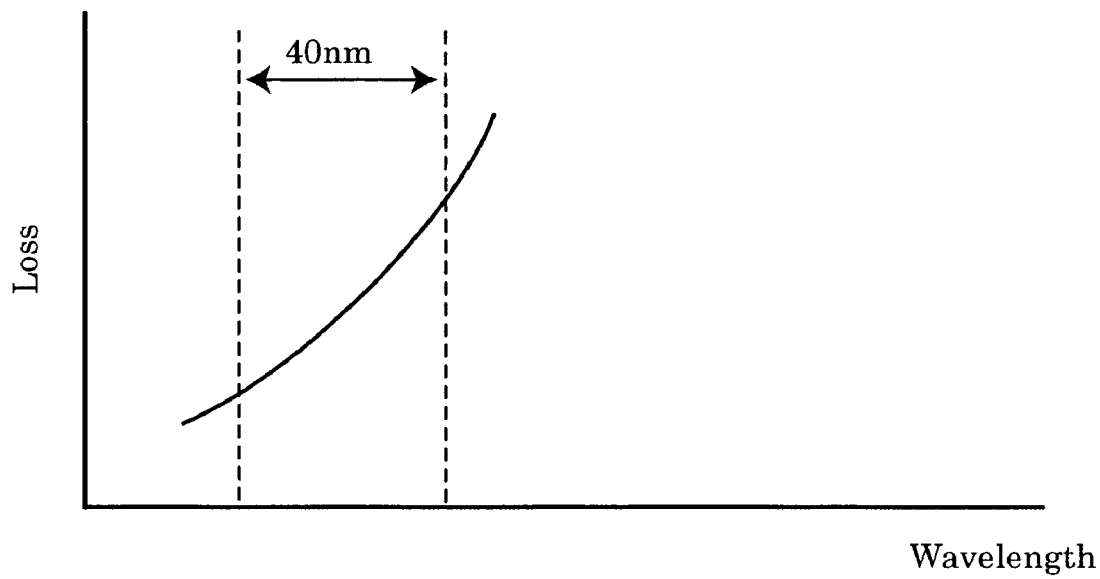
FIG. 3 is a diagram illustrating the loss spectrum of an optical filter used in the first embodiment.

FIG. 3 is a diagram illustrating the loss spectrum of the optical filter 15 in the first embodiment. As the wavelength increases, the loss of the optical filter 15 also substantially monotonously increases in the 40-nm band of wavelength range containing the wavelength of the pulse light. The optical filter 15 adjusts the spectrum of the wide-band light so that, as the wavelength increases, the spectrum of the pulse light substantially monotonously decreases in the 40-nm band of the wavelength range containing the wavelength of the pulse light, except in the wavelength of the pulse light, as indicated by the solid line in FIG. 2C.

Figure 4:
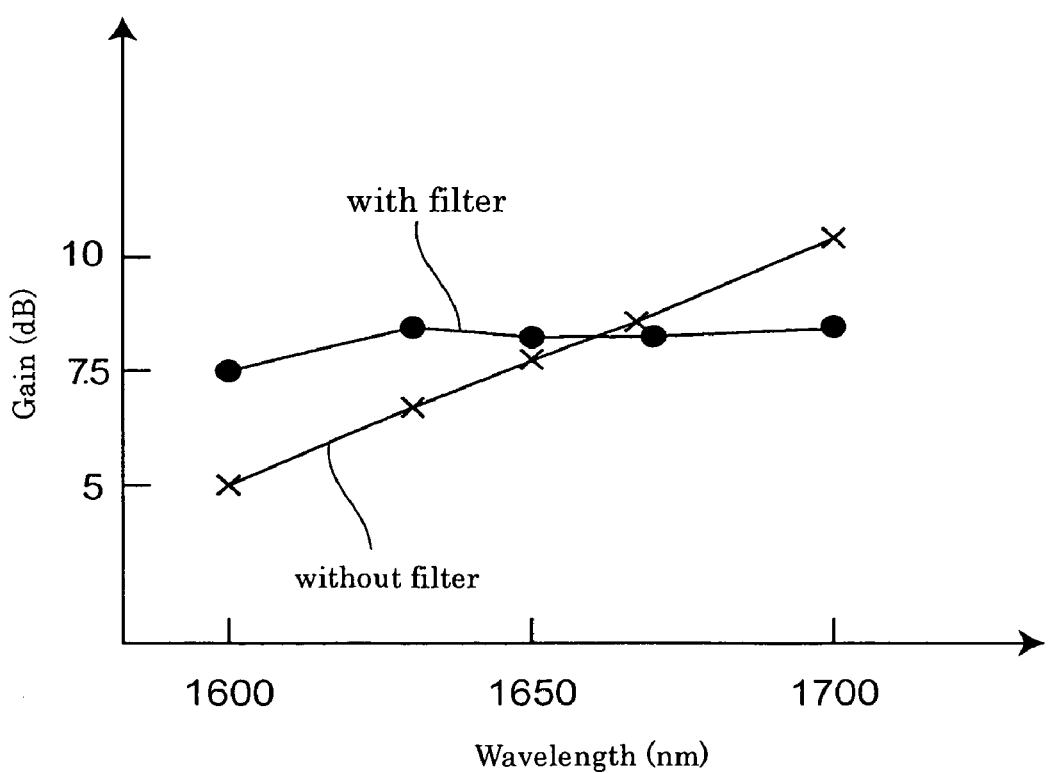
FIG. 4 illustrates the function of the optical filter used in the first embodiment.

FIG. 4 illustrates the function of the optical filter 15. The spectrum of the wide-band light is adjusted by the optical filter 15 so that a variation in the Raman gain in a bandwidth of 60 nm in a wavelength range from 1600 to 1700 nm becomes 2.5 dB or smaller.

As in the first embodiment, in the Raman-amplification optical fiber 11, it is preferable that pump light propagates in the direction opposite to a direction in which the signal light propagates. In this case, if the pump light is pulse light whose power changes over time, the change in the gain of the Raman amplifier 1 over time can be contained to a small range if the pulse power is constant.

The Raman-amplification optical fiber 11 may be a usual transmission optical fiber rather than a highly non-linear optical fiber. In this case, the Raman amplifier 1 can serve as a distributed Raman amplifier so as to effectively reduce the loss of an optical transmission line.

This Raman amplifier 1 requires only one set of the light source 12, the optical amplifier 13, the SC optical fiber 14, the optical filter 15, and the optical circulator 16, thereby reducing the size of the Raman amplifier 1. Also in the Raman amplifier 1, the gain band can be increased.

It is preferable that the bandwidth of the wide-band light output from the SC optical fiber 14 be 40 nm or greater. In this case, multiplexed wide-band light having different wavelengths can be simultaneously amplified by Raman amplification using a single light source.

It is preferable that the pulse width of the pulse light output from the light source 12 be 5 ps or smaller. In this case, since the pulse light has high peak power, only a short-length SC optical fiber 14 is required to efficiently generate wide-band light.

In the optical transmission system that is provided with the Raman amplifier 1 and used for transmitting multi-wavelength signal light, since the gain spectrum in the Raman amplifier 1 is wide and flat, the controller of the optical transmission system can be simplified and the management of the system can be facilitated.

Second Embodiment

Figure 5:
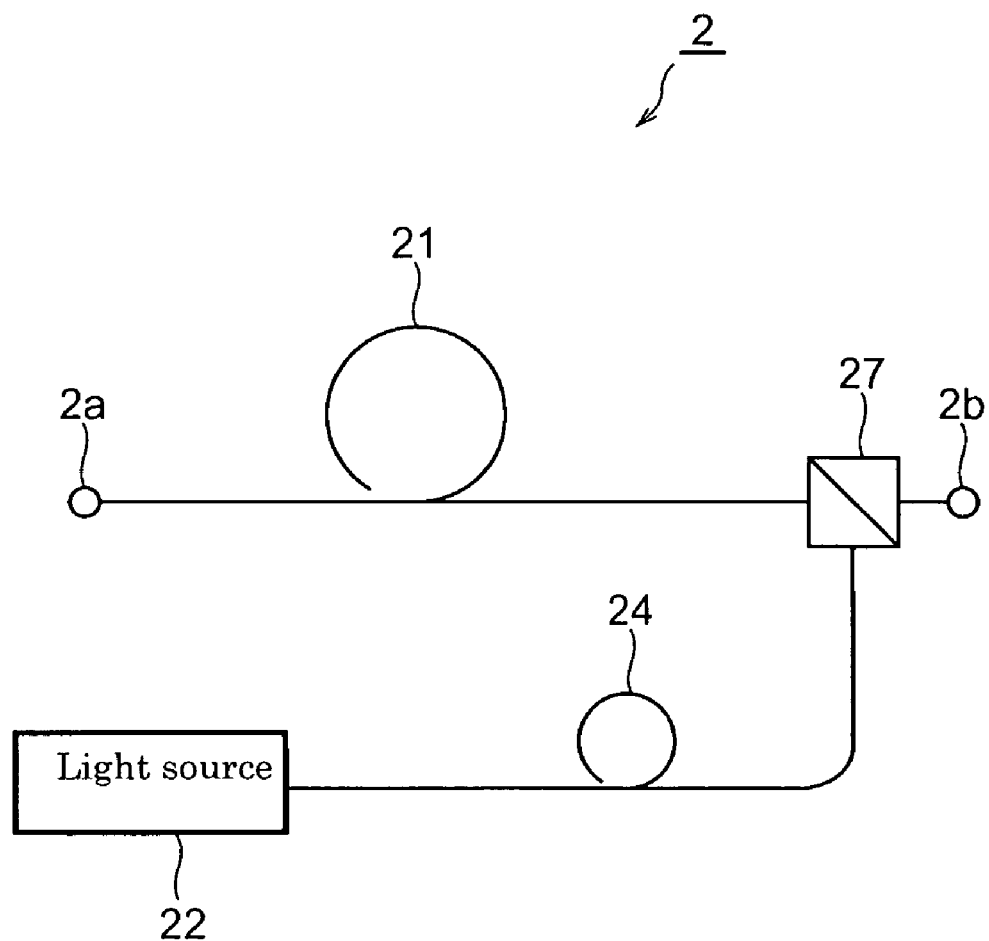
FIG. 5 schematically illustrates a Raman amplifier according to a second embodiment of the present invention.

A Raman amplifier 2 constructed in accordance with a second embodiment of the present invention is described below with reference to FIGS. 5 through 6B. The Raman amplifier 2 of FIG. 5, which causes signal light input from an input terminal 2a to undergo Raman amplification and outputs the signal light from an output terminal 2b, includes a Raman-amplification optical fiber 21, a light source 22, an SC optical fiber 24, and a wavelength division multiplexing (WDM) optical coupler 27.

The Raman-amplification optical fiber 21, which is a highly non-linear optical fiber, receives pump light for Raman amplification output from the WDM optical coupler 27, and causes signal light input from the input terminal 2a to undergo Raman amplification while the signal light is being propagated therethrough. The light source 22 outputs pulse light. The SC optical fiber 24, which serves as the wide-band-light generating means, allows the pulse light output from the light source 22 to propagate therethrough so that light having a wider band than the pulse light is generated during such propagation and is output therefrom.

The WDM optical coupler 27 receives the wide-band light from the SC optical fiber 24, and supplies it backward to the Raman-amplification optical fiber 21 as pump light for Raman amplification. The WDM optical coupler 27 also receives the signal light that has been amplified by Raman amplification in the Raman-amplification optical fiber 21, and outputs the signal light to the output terminal 2b.

Figure 6A:
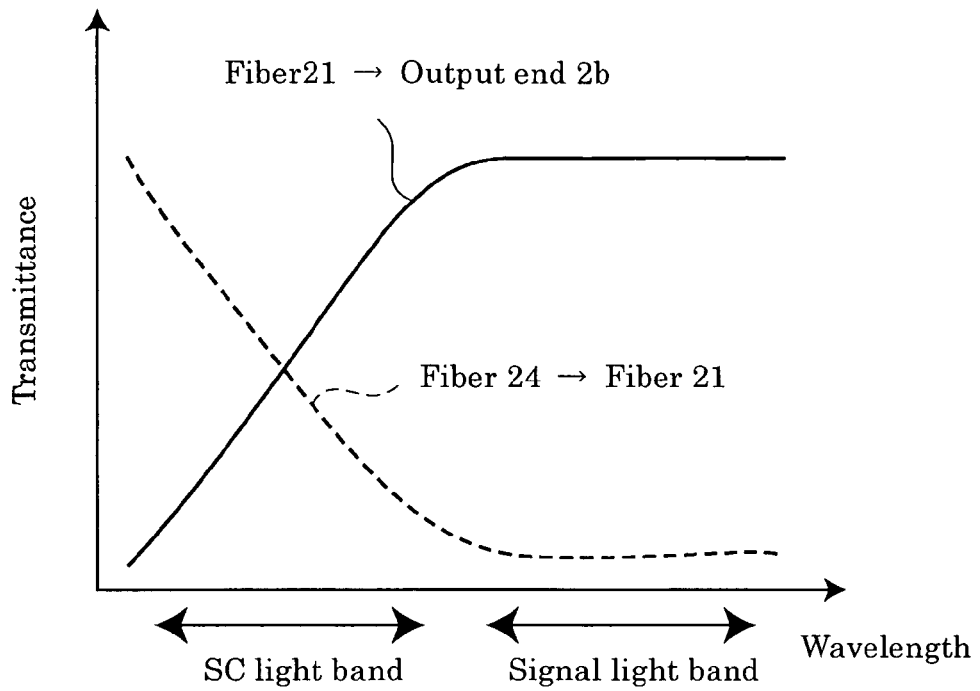
FIGS. 6A and 6B are diagrams illustrating the function of a wavelength division multiplexing (WDM) optical coupler used in the second embodiment.
Figure 6B:
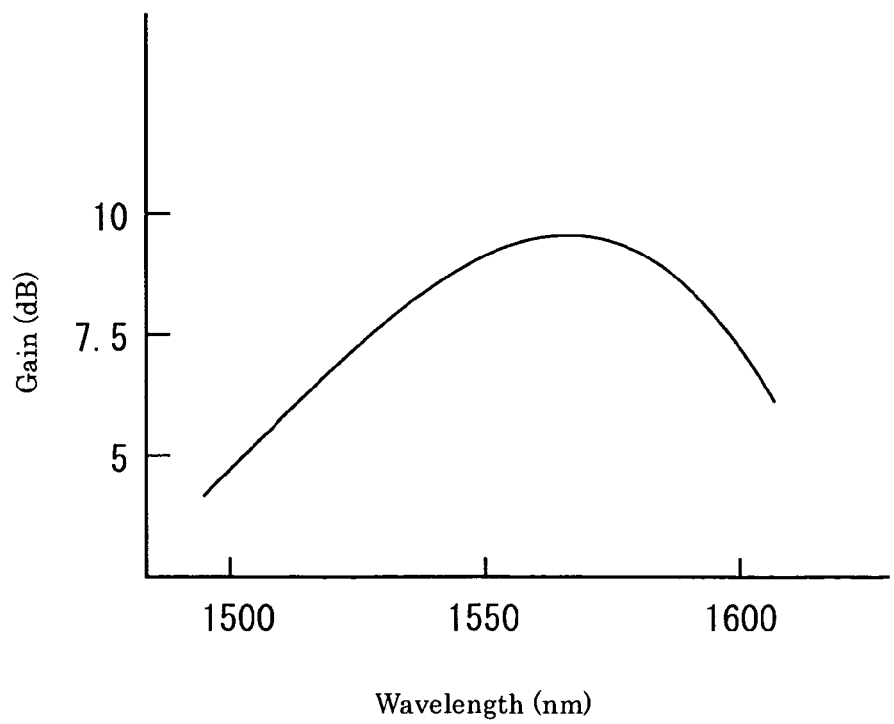

FIGS. 6A and 6B illustrate the function of the WDM optical coupler 27 in the Raman amplifier 2 of the second embodiment. As indicated by the broken line in FIG. 6A, when light output from the SC optical fiber 24 is supplied to the Raman-amplification optical fiber 21 via the WDM optical coupler 27, the transmittance of the WDM optical coupler 27 decreases in the wavelength range of light output from the SC optical fiber 24 as the wavelength increases. That is, the WDM optical coupler 27 of the second embodiment also serves as the optical filter 15 of the first embodiment. As indicated by the solid line in FIG. 6A, the transmittance at the WDM optical coupler 27 is flat in the wavelength range of the Raman-amplified signal light when the signal light that has been output from the Raman-amplification optical fiber 21 is supplied to the output terminal 2b via the WDM optical coupler 27.

The operation of the Raman amplifier 2 is as follows. Narrow-band pulse light output from the light source 22 is input into the SC optical fiber 24. When the pulse light is input into the SC optical fiber 24, wide-band supercontinuum (SC) light is generated in the SC optical fiber 24. This wide-band light, the spectrum of which is adjusted in the WDM optical coupler 27, is supplied to the Raman-amplification optical fiber 21 as pump light for Raman amplification.

Signal light is input into the Raman-amplification optical fiber 21 via the input terminal 2a, and is subjected to Raman amplification in the Raman-amplification optical fiber 21. The Raman-amplified signal light is then output from the output terminal 2b via the WDM optical coupler 27. With the WDM optical coupler 27 provided for adjusting the spectrum of the wide-band light output from the SC optical fiber 24, the spectrum of pump light for Raman amplification to be supplied to the Raman-amplification optical fiber 21 can be adjusted. As a result, the gain spectrum of the Raman-amplification optical fiber 21 can be flattened.

As a specific example, in the case where a high-output semiconductor laser having a wavelength of 1.45 μm is used as the light source 22, the spectrum of the wide-band light may be adjusted by the WDM optical coupler 27 so that the variation of the Raman gain may become 5.0 dB or smaller in a wavelength range of 60 nm between 1500 nm and 1600 nm as shown in FIG. 6B.

This Raman amplifier 2 requires only one set of the light source 22, the SC optical fiber 24, and the WDM optical coupler 27, thereby allowing the reduction of the size of the Raman amplifier 2. Also in the Raman amplifier 2, the gain band can be increased. As in the first embodiment, in the second embodiment, it is preferable that the bandwidth of the wide-band light output from the SC optical fiber 24 be 40 nm or greater. It is also preferable that the non-linear coefficient of the SC optical fiber 24 be 10/W/km or greater, and it is preferable that the pulse width of the pulse light output from the light source 22 be 5 ps or smaller.

Third Embodiment

Figure 7:
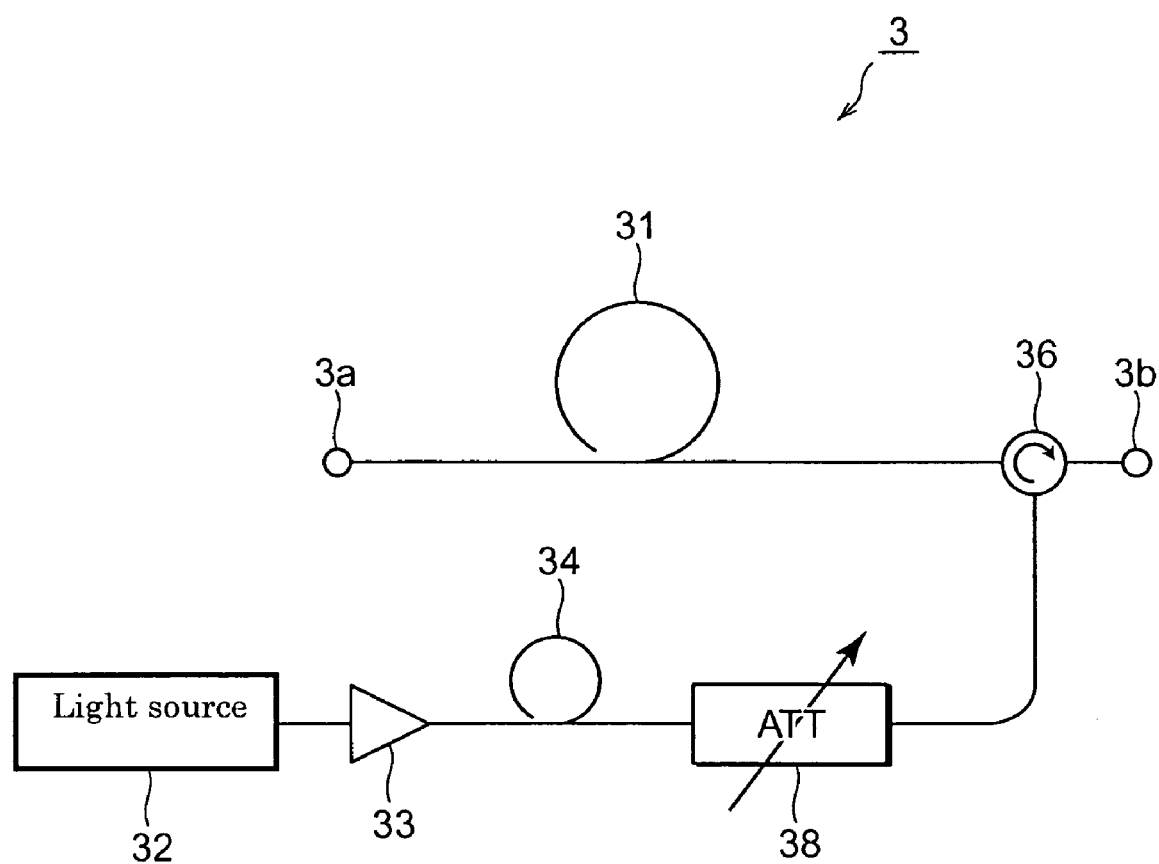
FIG. 7 schematically illustrates a Raman amplifier according to a third embodiment of the present invention.

A Raman amplifier 3 constructed in accordance with a third embodiment of the present invention is described below with reference to FIGS. 7 and 8. The Raman amplifier 3 of FIG. 7 causes signal light, which has been input from an input terminal 3a, to undergo Raman amplification, and outputs the amplified signal light from an output terminal 3b. The Raman amplifier 3 includes a Raman-amplification optical fiber 31, a light source 32, an optical amplifier 33, a SC optical fiber 34, an optical circulator 36, and a variable attenuator 38.

The Raman-amplification optical fiber 31, which is a highly non-linear optical fiber, receives pump light for Raman amplification output from the optical circulator 36, and causes the signal light input from the input terminal 3a to undergo Raman amplification while it is propagated therethrough. The light source 32 outputs pulse light. The optical amplifier 33 amplifies the pulse light output from the light source 32 and outputs it.

The SC optical fiber 34, which serves as the wide-band-light generating means, allows the pulse light output from the optical amplifier 33 to propagate therethrough, and during such propagation, generates and outputs light having a wider band than the input pulse light. The variable attenuator 38 receives the light output from the SC optical fiber 34, and affords loss to the light and outputs it.

The optical circulator 36 receives the light output from the variable attenuator 38, and supplies the light, as pump light for Raman amplification, backward to the Raman-amplification optical fiber 31. The optical circulator 36 also receives the signal light that has been amplified by Raman amplification in the Raman-amplification optical fiber 31, and outputs the signal light to the output terminal 3b.

The operation of the Raman amplifier 3 is as follows. Narrow-band pulse light output from the light source 32 is amplified by the optical amplifier 33, and is input into the SC optical fiber 34. When the pulse light is input into the SC optical fiber 34, wide-band supercontinuum (SC) light is generated. The intensity of this wide-band light is adjusted by the variable attenuator 38, and the resultant wide-band light is supplied, as pump light for Raman amplification, to the Raman-amplification optical fiber 31 via the optical circulator 36.

Signal light is input into the Raman-amplification optical fiber 31 via the input terminal 3a, and undergoes Raman amplification in the Raman-amplification optical fiber 31. The Raman-amplified signal light is output from the output terminal 3b via the optical circulator 36. The intensity of the pump light for Raman amplification to be supplied to the Raman-amplification optical fiber 31 can be adjusted by means of the variable attenuator 38 that adjusts the intensity of the wide-band light output from the SC optical fiber 34.

This Raman amplifier 3 requires only one set of the light source 32, the optical amplifier 33, the SC optical fiber 34, the optical circulator 36, and the variable attenuator 38, thereby allowing the reduction of the size of the Raman amplifier 3. Also in the Raman amplifier 3, the gain band can be increased. As in the first and second embodiments, in the third embodiment, it is preferable that the bandwidth of the wide-band light output from the SC optical fiber 34 be 40 nm or greater. It is also preferable that the non-linear coefficient of the SC optical fiber 34 be 10/W/km or greater, and it is preferable that the pulse width of the pulse light output from the light source 32 be 5 ps or smaller.

The Table indicates the parameters of examples of optical fibers preferably used as the Raman-amplification optical fiber 31 or the SC optical fiber 34 of the Raman amplifier 3 according to the third embodiment. The Table shows the length, loss, chromatic dispersion, dispersion slope, effective core area, non-linear coefficient, and polarization mode dispersion, with respect to four kinds of optical fibers (highly non-linear optical fibers HNLF1, HNLF2, and HNLF3, and a dispersion-flattened decreased optical fiber DFDF). These parameters are for the wavelength of 1.55 μm.

TABLE

| Fiber | HNLF1 | HNLF2 | HNLF3 | DFDF |
|---|---|---|---|---|
| Length (m) | 5000 | 500 | 1000 | 1000 |
| Loss (dB/km) | 0.50 | 0.51 | 0.32 | 0.22 |

TABLE-continued

| Fiber | HNLF1 | HNLF2 | HNLF3 | DFDF |
|---|---|---|---|---|
| Chromatic dispersion (ps/nm/km) | −13.00 | 1.00 | −0.20 | 0.32 |
| Dispersion slope (ps/nm²/km) | 0.0200 | 0.0300 | 0.0280 | 0.0036 |
| Effective core area (μm²) | 9.5 | 11.0 | 10.5 | 27 |
| Non-linear coefficient (1/W/km) | 20.4 | 20.3 | 10.0 | 5.1 |
| Polarization mode dispersion (ps/√km) | 0.05 | 0.03 | 0.05 | 0.08 |

In an experiment for the case of pulse light having a pulse width of 5 ps and a peak power of 1 W, generation of SC light having 40 nm or wider was recognized using HNLF1 through HNLF3; however, in the case of DFDF, such increase of band was not recognized. When the peak power was increased to 2 W or higher by using an optical amplifier, generation of SC light was recognized in the case of DFDF as well FIG. 8 is a graph illustrating the gain spectrum of the Raman amplifier 3 of the third embodiment. The results of FIG. 8 were obtained under the following conditions. The highly non-linear optical fiber HNLF1 was used as the Raman-amplification optical fiber 31, and the highly non-linear optical fiber HNLF2 was used as the SC optical fiber 34. The wavelength and the pulse width of the pulse light output from the light source 32 were 1.55 μm and 3 ps, respectively. An Er-doped optical fiber amplifier was used as the optical amplifier 33. FIG. 8 also shows the gain spectrum of a Raman amplifier without the SC optical fiber 34 (indicated by the broken line) together with the gain spectrum of the Raman amplifier 3 with the SC optical fiber 34 (indicated by the solid line).

Figure 8:
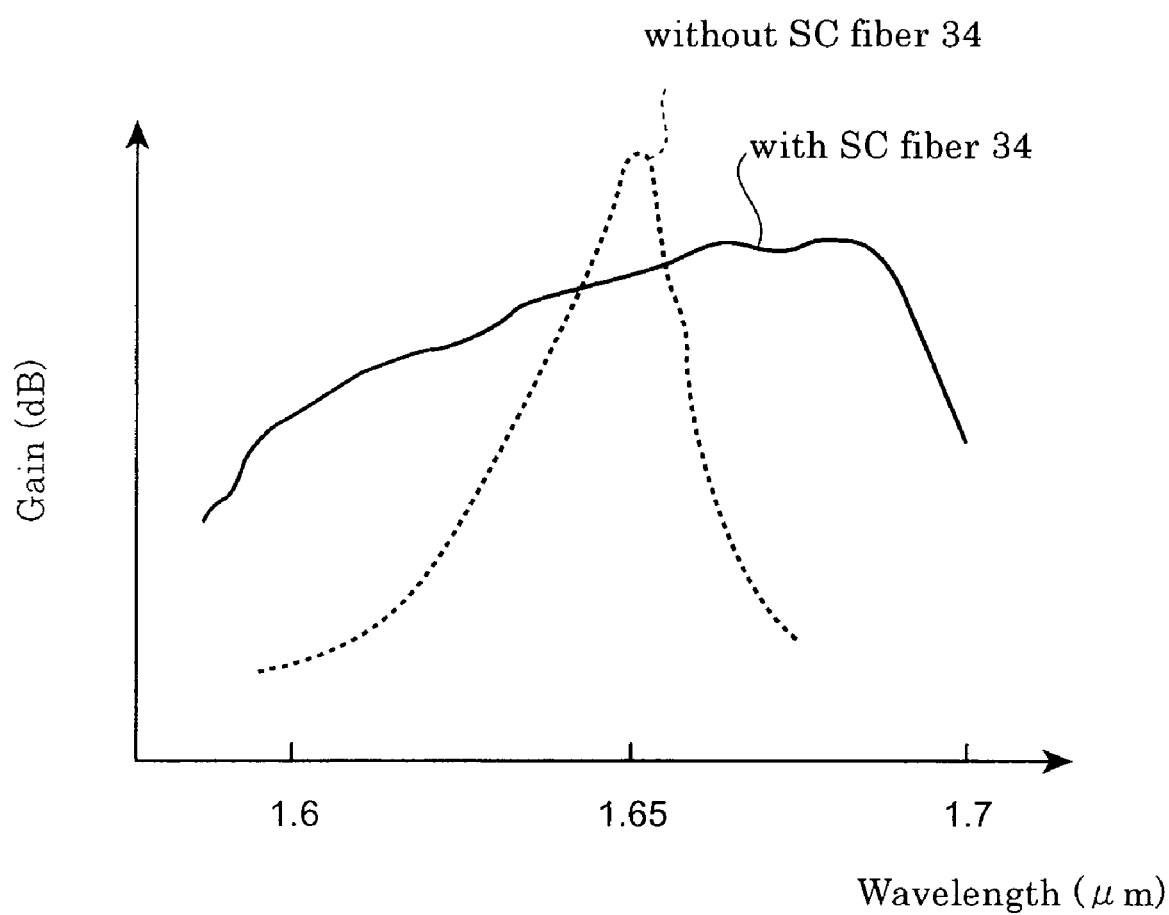
FIG. 8 is a diagram illustrating the gain spectrum of the Raman amplifier of the third embodiment.

FIG. 8 reveals that the gain band of the Raman amplifier 3 becomes wider by providing the SC optical fiber 34. When the highly non-linear optical fiber HNLF3 or the dispersion-flattened decreased optical fiber DFDF was used as the SC optical fiber 34, the gain band was also increased.

While this invention has been described in connection with what is presently considered to be the most practical and preferred embodiments, the invention is not limited to the disclosed embodiments, but on the contrary, is intended to cover various modifications and equivalent arrangements included within the spirit and scope of the appended claims.

The entire disclosure of Japanese Patent Application 2003-171021 filed on Jun. 16, 2003 including specification, claims, drawings, and summary are incorporated herein in its entirety.

What is claimed is:

1. A Raman amplifier comprising:
   a Raman-amplification optical fiber;
   a light source for outputting pulse light;
   a wide-band-light generating means for receiving the pulse light from the light source and outputting wide-band light having a wider wavelength range than the received pulse light;
   an optical filter for adjusting the spectrum of the wide-band light, the optical filter having loss which substantially monotonously increases as the wavelength increases in a wavelength range of 40 nm containing the wavelength of the pulse light; and
   a pump-light supply means for supplying the wide-band light output from the optical filter to the Raman-amplification optical fiber.

2. A Raman amplifier comprising:
   a Raman-amplification optical fiber;
   a light source for outputting pulse light;
   a wide-band-light generating means for receiving the pulse light from the light source and outputting wide-band light having a wider wavelength range than the received pulse light;
   an optical filter for adjusting the spectrum of the wide-band light so that, as the wavelength increases, the spectrum of the wide-band light substantially monotonously decreases in a wavelength range of 40 nm containing the wavelength of the pulse light, except in the wavelength range of the pulse light; and
   a pump-light supply means for supplying the wide-band light output from the optical filter to the Raman-amplification optical fiber.

3. A Raman amplifier comprising:
   a Raman-amplification optical fiber;
   a light source for outputting pulse light;
   a wide-band-light generating means for receiving the pulse light from the light source and outputting wide-band light having a wider wavelength range than the received pulse light;
   an optical filter for adjusting the spectrum of the wide-band light so that the variation of the Raman gain in a wavelength range of 60 nm between 1500 nm and 1600 nm becomes 5.0 dB or smaller; and
   pump-light supply means for supplying the wide-band light output from the optical filter to the Raman-amplification optical fiber.

4. A Raman amplifier comprising:
   a Raman-amplification optical fiber;
   a light source for outputting pulse light;
   a wide-band-light generating means for receiving the pulse light from the light source and outputting wide-band light having a wider wavelength range than the received pulse light;
   an optical filter for adjusting the spectrum of the wide-band light so that the variation of the Raman gain at the wavelength range of 60 nm in a wavelength range between 1600 nm and 1700 nm becomes 2.5 dB or smaller; and
   pump-light supply means for supplying the wide-band light output from the optical filter to the Raman-amplification optical fiber.

5. A Raman amplifier according to any one of claims 1 to 4, wherein the bandwidth of the wide-band light output from the wide-band-light generating means is 40 nm or greater.

6. A Raman amplifier according to any one of claims 1 to 4, wherein the wide-band-light generating means comprises an optical fiber having a non-linear coefficient of 10/W/km or greater.

7. A Raman amplifier according to any one of claims 1 to 4, wherein the pulse width of the pulse light is 5 ps or smaller.

8. An optical transmission system for transmitting multi-plexed-wavelength signal light, comprising the Raman amplifier set forth in any one of claims 1 to 4.

* * * * *